United States Patent
Barbarin et al.

[15] 3,704,021
[45] Nov. 28, 1972

[54] SEAL ASSEMBLY

[72] Inventors: Jean-Francois Barbarin, Ruelle; Jacques Beaumatin, La Montagne, both of France

[73] Assignee: Etat Francais, Paris, France

[22] Filed: Oct. 15, 1970

[21] Appl. No.: 80,931

[30] Foreign Application Priority Data

Oct. 17, 1969 France..................6935565

[52] U.S. Cl..................277/180, 277/188, 277/198
[51] Int. Cl...........................F16j 15/00, F16j 19/02
[58] Field of Search.............277/180, 188, 11, 198; 285/368

[56] References Cited

UNITED STATES PATENTS 3,167,322   1/1965   Aichroth..................277/180

FOREIGN PATENTS OR APPLICATIONS 701,614   12/1953   Great Britain.............277/180
1,193,987   5/1959   France......................277/188

Primary Examiner—Samuel B. Rothberg
Attorney—Waters, Roditi, Schwartz & Nissen

[57] ABSTRACT

A seal assembly comprises an inner ring of plastic material on which a toroidal elastomer is mounted in tension. An outer ring of plastic material is on the elastomer and a rigid metal ring encircles the outer plastic ring. The outer plastic ring has greater thickness than the inner plastic ring and the metal ring.

7 Claims, 2 Drawing Figures

PATENTED NOV 28 1972 3,704,021
FIG.1
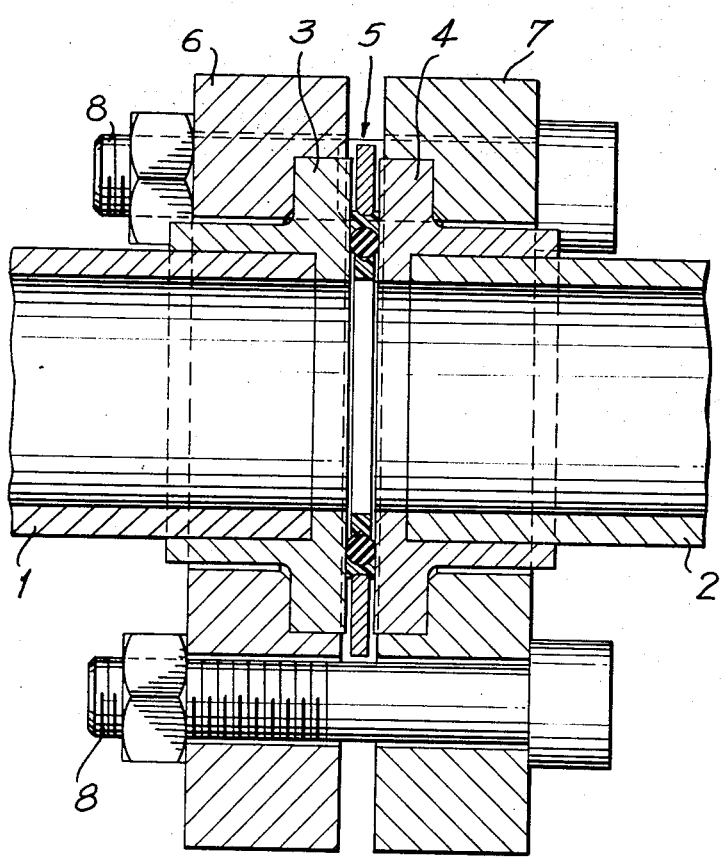
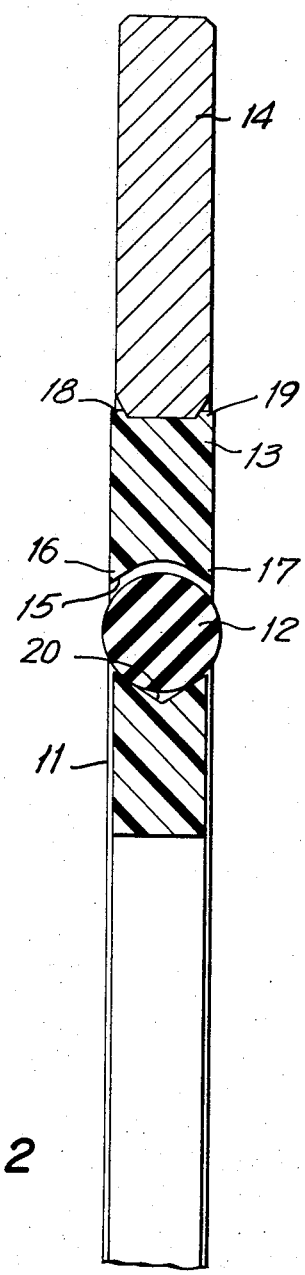
FIG.2

3,704,021

SEAL ASSEMBLY

BRIEF SUMMARY OF THE INVENTION

The present invention relates to a seal for a hydraulic system under pressure and particularly to a seal between pipe couplings or the like.

Various kinds of seal devices are known for this purpose. Some of them assure leakproofness through pressure between two steel surfaces allowing only a limited number of assemblies and dismantlings; these seal devices are usually used only for small diameters. Other seal devices are based on use of a toroidal elastomer which can be used for large bores but are limited in pressure resistance because of the risk of the material being forced out.

The invention lies in the combination of the strength of a metal collar or ring with the plasticity of a ring to obviate a forcing-out of an elastomer seal member. The elastomer seal member prevents leakage and is constituted as a toroidal O-ring held tightly between two machined faces of caps mounted on the ends of the piping sections to be joined.

The seal device according to the present invention is resistant to leakage at pressures ranging from 0 to 1,400 bars. The seal device according to the invention can be used for coupling sections of piping, for coupling a piping section to a part with a planar fastening surface, and for coupling two parts with planar fastening surfaces.

According to the invention the seal device comprises an assembly of an inner ring of plastic material, a toroidal elastomer encircling said inner ring, an outer ring of plastic material on said elastomer, and a rigid metal ring on the outer ring.

In further accordance with the invention the outer ring has a thickness greater than the inner ring and metal ring, said elastomer having a diameter greater than the thickness of the outer ring.

BRIEF DESCRIPTION OF THE DRAWING

FIG. 1 is a sectional view showing the seal device according to the invention installed between two coupled pipe sections; and FIG. 2 is an enlarged sectional view of a portion of the seal device.

DETAILED DESCRIPTION

Referring to FIG. 1 of the drawing therein are seen two pipe sections 1, 2 coupled together in sealed relation. The pipe sections carry respective caps 3, 4 between which is clamped a seal assembly 5. Rings 6 and 7 are respectively mounted on caps 3 and 4 and bolts 8 connect the rings 6 and 7 to effect the clamping of the seal assembly 5 between the caps 3 and 4.

The seal assembly is shown in greater detail in FIG. 2 and therein can be seen an inner ring 11 of plastic material on which is mounted a toroidal elastomer 12 constituted as a conventional O-ring. Mounted on the elastomer 12 is an outer ring 13 of plastic material and a rigid steel ring 14 is mounted on the outer ring 13 to complete the seal assembly.

The ring 14 is made of metal such as steel. It serves as a collar for the ring 13 and enables it to resist the high internal pressures.

The ring 14 is fitted on the plastic ring 13 by simple hand pressure. To facilitate this operation, the metal ring 14 is beveled at its edges at its inner surface.

The ring 13 is made of plastic material and its thickness is slightly greater than that of the metal ring 14. It has a concave inner surface of V-section, whose sides are joined by an arc of a radius equal to that of the elastomer 12.

The outer surface of ring 13 has raised rims 18 and 19 at its extremities for seating of the metal ring 14 after the latter has been set in position.

The inner ring 11 is made of plastic and it has an outer surface with a V-groove 20 wherein the elastomer 12 is lodged with slight tension. Ring 11 is of the same thickness as the metal ring 14.

The diametric dimensions of the three rings firstly, permits their assembly by hand with the elastomer mounted on the inner ring 11 and secondly, the achievement of a unit which cannot come apart under the action of the mass of each of its elements. The seal assembly thus formed can be stored as is for subsequent use.

As previously noted the thickness of the ring 13 is less than the diameter of the elastomer 12 so as to enable normal compressibility of the elastomer when used in the joint in FIG. 1. The ring 13 however is slightly greater than the thickness of the other rings 11 and 14.

The result of this construction, apart from the compression of the elastomer 12, is that the tightening force is exerted solely on the ring 13. In this way, the ring prevents extrusion of the elastomer 12.

This effect continues when the piping assembly is under high pressures. Actually, the elastomer 12 under the pressure thrust closely engages the concave groove at the inner face of ring 13. Under tensile force the bolts 8 elongate. As a consequence of such elongation, the caps 3, 4 fastened to the piping sections are urged apart. Under the action of the elastomer, which flattens out under pressure, the tapered rim portions of the ring 13 also open out and continue to function as a barrier to extrusion of the elastomer 12.

Furthermore, the additional thickness of the ring 13 combined with the deformability of its two rims 16 and 17 assures leakproofness whenever the machined surfaces of the caps 3 and 4 are not parallel. This important property allows lack of alignment between the faces of the caps 3 and 4.

The installation of the seal assembly sections in position is quick, since its centering with respect to the pipe sections comes directly through pressure of the outside rings by the assembly of bolts of the coupling. For dismantling during periodic inspection, the piping sections are separated slightly, for the seal assembly to be removed after the lower bolts are withdrawn.

What is claimed is:

1. A seal assembly comprising an inner ring of plastic material, a toroidal elastomer encircling said ring, an outer ring of plastic material on said elastomer, and a rigid metal ring on the outer ring, said outer ring having a thickness greater than the inner ring and metal ring, said elastomer having a diameter greater than the thickness of the outer ring, said outer ring having an inner surface in which said elastomer is seated, said inner surface having V-shaped side walls and a curved connection portion between said walls having a radius equal to the elastomer.

2. A seal assembly as claimed in claim 1 wherein said metal ring is steel.

3. A seal assembly as claimed in claim 1 wherein said inner ring has an outer surface of V-shape in which said elastomer is seated.

4. A seal assembly as claimed in claim 1 wherein said outer ring has an outer surface with raised rims at the extremities thereof, said metal ring being seated between said rims.

5. A seal assembly as claimed in claim 1 wherein said outer ring has beveled edges for being seated between said rims.

6. A seal assembly as claimed in claim 1 in combination with two members to be sealed, said seal assembly being inserted between said two members and clamped therebetween.

7. A seal assembly as claimed in claim 1 wherein said elastomer is engaged with tension on said inner ring to stress said assembly and hold the same in self-maintaining state.

* * * * *